United States Patent
Singla et al.

(10) Patent No.: US 12,137,060 B1
(45) Date of Patent: Nov. 5, 2024

(54) RESOURCE BUFFER CAPACITY MANAGEMENT

(71) Applicant: Amazon Technologies, Inc., Seattle, WA (US)

(72) Inventors: Ankush Singla, Vancouver (CA); Christopher Thomas Lewis, Vancouver (CA); Wilson Lau, Richmond (CA)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 17/854,469

(22) Filed: Jun. 30, 2022

(51) Int. Cl.
*H04L 49/90* (2022.01)
*H04L 47/10* (2022.01)
*H04L 47/129* (2022.01)
*H04L 47/30* (2022.01)

(52) U.S. Cl.
CPC ........ *H04L 49/9084* (2013.01); *H04L 47/129* (2022.05); *H04L 47/29* (2013.01); *H04L 47/30* (2013.01)

(58) Field of Classification Search
CPC ...... H04L 49/9084; H04L 47/29; H04L 47/30
See application file for complete search history.

(56) References Cited

U.S. PATENT DOCUMENTS

2020/0310881 A1* 10/2020 Gonzalez .............. G06F 9/5027

* cited by examiner

*Primary Examiner* — Siming Liu
(74) *Attorney, Agent, or Firm* — Lee & Hayes, P.C.

(57) ABSTRACT

Systems and techniques are disclosed for a buffer management system that dynamically and automatically adjusts operational buffers in resources based on resource utilization based on buffer parameters. Buffer parameters for a resource can include a target utilization, a buffer capacity, a minimum buffer capacity, and a maximum buffer capacity. The buffer management detects changes in utilization, such as a number of operations performed in a time period and determines whether a candidate buffer capacity determined using the buffer capacity parameter and the current utilization is between the minimum buffer capacity and the maximum buffer capacity. If so, the buffer management system sets the buffer capacity to the candidate buffer capacity, otherwise the buffer management system sets the buffer capacity to the minimum or maximum buffer capacity as applicable.

20 Claims, 7 Drawing Sheets

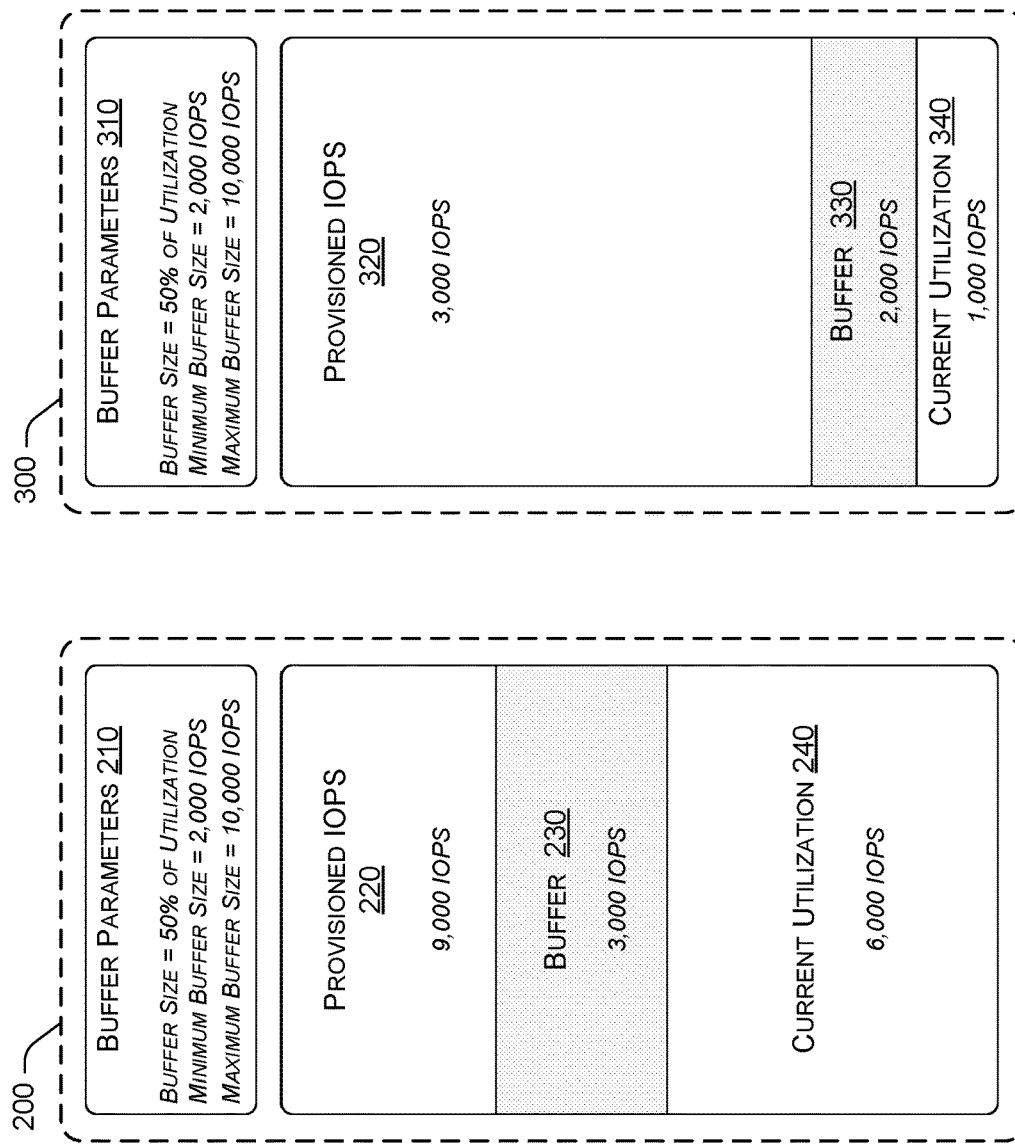

RESOURCE BUFFER CAPACITY MANAGEMENT

BACKGROUND

A service provider may operate multiple geographically diverse data centers that provide various types of resources for customers on a permanent and/or an as-needed basis. These resources may include computing resources such as data processing resources, data storage resources, networking resources, data communication resources, network services, virtual machine instances, and virtual machine storage services, among others. These resources may also include operations performed using one or more computing resources, such as database operation (read and write operations), data transmission and reception operations (input and output operations), etc. A customer may operate a system that utilizes many such resources in a variety of configurations. The resources associated with a customer system may be initially configured by, or on behalf of, the customer. As a customer's business needs change over time, the number and/or types of computing resources best suited to address those needs may change.

The quantity and types of resources needed in a customer's system may change very rapidly and/or in unpredictable ways. For example, a major event, like a news event, entertainment event, financial event, etc., may occur that may impact a customer's system. In response to such an event, the customer's system may, for example, experience a dramatic increase in the amount of traffic or a rapid decrease in the number of requests for data. It is challenging for a service provider and a customer to rapidly respond to such changes in resource needs while ensuring an efficient allocation of such resources.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates a block diagram representing an example resource and buffer parameters that may be implemented according to the various buffer scaling technologies disclosed herein.

FIG. 3 illustrates another block diagram representing an example resource and buffer parameters that may be implemented according to the various buffer scaling technologies disclosed herein.

FIG. 4 illustrates another block diagram representing an example resource and buffer parameters that may be implemented according to the various buffer scaling technologies disclosed herein.

DETAILED DESCRIPTION

Figure 1:
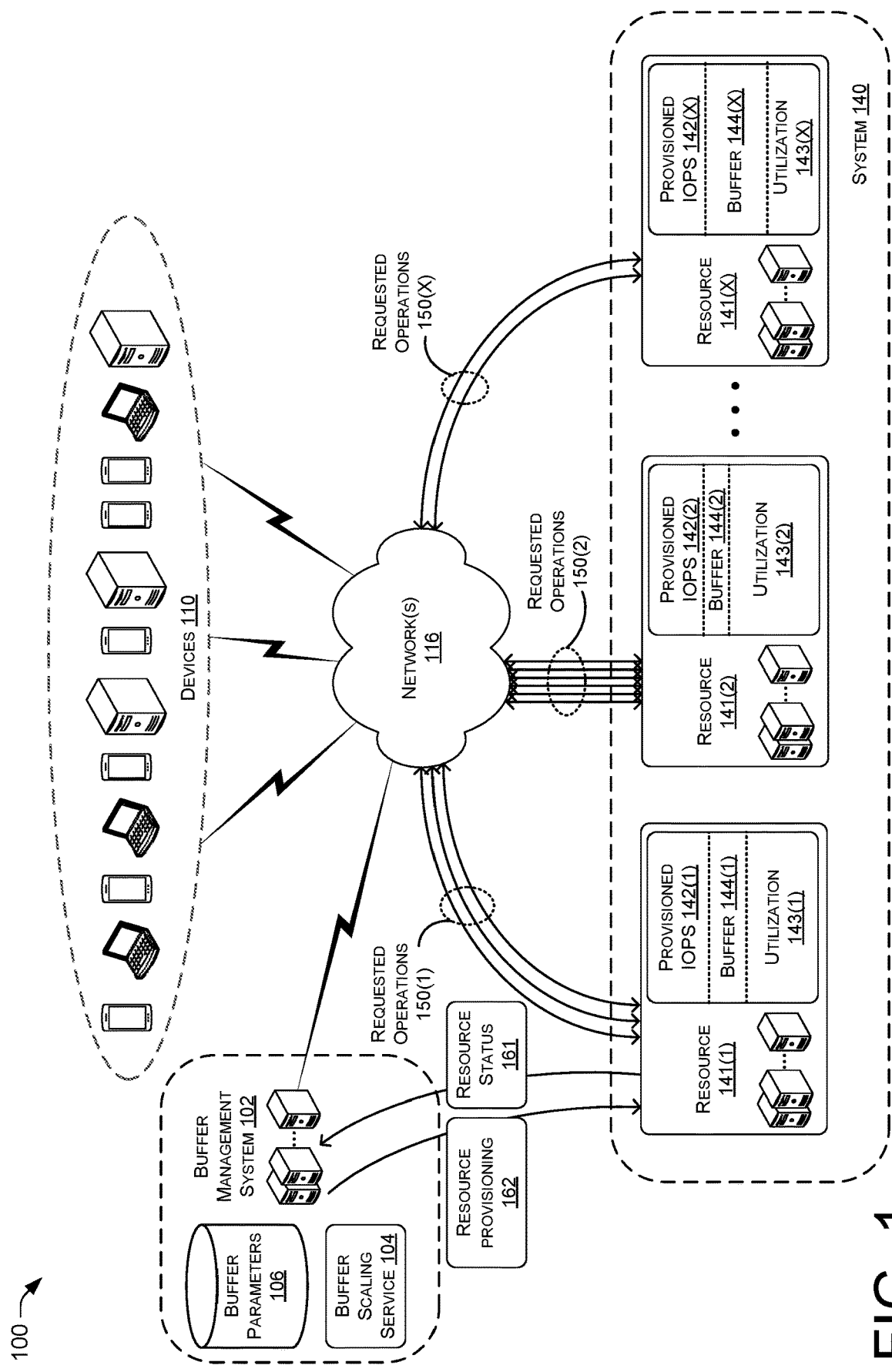
FIG. 1 illustrates a system-architecture diagram of an example environment in which a resource buffer scaling system may be implemented.

The present disclosure relates to resource buffer management systems and methods that may be used to implement scaling adjustments to for the quantity of resources used in a system that includes multiple resources. Specifically, the present disclosure relates to a reactive autoscaling technique based on buffer capacity, where such autoscaling automates how groups of different resources (for example, the different resources behind a load balancer ("autoscaling group")) and/or the different resources that comprise a workload or application) respond to changes in demand. For example, a service provider may provide one or more resources for a customer system. The resource requirements of the system may be provided by the customer to the service provider and may change over time with the customer's needs and goals (e.g., based on the utilization of the system by the customer and/or user of the customer system). The customer system may include various types of physical and/or logical resources, such as computing resources, data processing resources, data storage resources, networking resources, data communication resources, and any other resources that may include one or more computing devices and/or components. Any such resource may be referred to herein as a "resource." The service provider may implement such a system using multiple resources that may be located across various geographical locations (e.g., in one or more data centers).

Target tracking allows customers to specify a target utilization value, for which an autoscaling service may make adjustments automatically to keep the resource at a specified target value. Target utilization value may be specified as a percentage of overall provisioned capacity. For example, if a target value is set at 50% and current utilization is 60 units, then a resource will be provisioned for 120 units. Since the target value is typically a percentage, for certain types of customers resources may be inefficiently provisioned. For example, a large customer using a target value of 90 may end up with too much spare capacity provisioned in absolute terms which will be unnecessarily costly. Alternatively, a small customer with a using a target value of 10 may end up with too little headroom which may result in an availability risk in the event of a spike in requests for the resource.

In various embodiments, a buffer management system may be configured to address these issues by adjusting a resource buffer based on one or more criteria associated with the resource's utilization level and within one or more bounds of buffer capacity. A buffer management system may determine a target resource capacity for a particular resource, for example based on buffer parameters provided in a customer request, historical average utilization, etc. Alternatively, a buffer management system may determine a current resource utilization for a particular resource. The buffer management system may be configured to maintain a resource buffer capacity for the resource based on the target resource capacity and/or current utilization. For example, the buffer management system may be configured (e.g., based on buffer parameters provided by a customer) to provision and/or maintain a resource buffer capacity of 50% of current resource utilization on a particular resource. The buffer management system may further be configured to provision the resource based on the resource buffer capacity and the current utilization (e.g., by providing the resource with an operational capacity substantially equivalent to the combined resource buffer capacity and current utilization).

The buffer management system may further be configured to maintain one or more buffer capacity bounds. Such bounds may be based on buffer parameters provided by a customer. For example, the buffer management system may be configured to maintain a minimum resource buffer capacity, even if the resource buffer capacity determined based on current utilization and/or target resource capacity is less than the minimum resource buffer capacity. The buffer management system may also, or instead, be configured to a maximum resource buffer capacity, even if the resource buffer capacity determined based on current utilization and/or target resource capacity is greater than the maximum resource buffer capacity In various embodiments, the buffer management system may be configured to use both a minimum resource buffer capacity and a maximum resource buffer capacity (and/or associated parameters). For example, a buffer management system may be configured to (e.g., automatically) adjust a resource's resource buffer capacity while ensuring that the resource buffer capacity neither falls below a minimum IOPS buffer capacity nor rises above a maximum resource buffer capacity.

By providing the ability to (e.g., automatically) adjust resource buffers while ensuring that at least minimum buffers are available without allowing buffer to grow beyond a suitable size, the disclosed system and methods may provide a customers and system operators efficient means of configuring and scaling systems for improved performance while minimizing inefficiencies.

In various examples, resource utilization may be measured in a variety of units, such as memory capacity, memory buffers, processor cycles, network transmission/reception capacity, network transmission/reception buffers, processor capacity, processor buffers, user activity (e.g., posts to a website, interactions with a page, interactions with a mobile or desktop application, etc.), system and/or component load of any type, any other measurable activity or operation, etc. In some examples used herein, resource utilization may be measured in input/output operations per second (IOPS). For example, the number of data stores/retrievals that a data storage resource may be capable of performing in one second may be indicated as a number of IOPS. When resources are configured for a customer system, the resources may be configured with a particular capacity for IOPS, that is, to be capable of performing a particular number of input/output operations per second. Such resources may also be configured with a resource buffer that provides additional capacity for IOPS.

In various embodiments, utilization capacity of a resource may be configured based on anticipated, historical, and/or actual usage of the resource. For example, a resource may be configured with a particular initial utilization capacity based on an anticipated level of user traffic and a buffer size. This anticipated level of user traffic may be based on the average level of user traffic experienced by the resource (and/or similar resources) over a period of time (e.g., the past six months). The portion of a resource's utilization capacity determined for an anticipated level of resource utilization may referred to as a "target" capacity. A utilization buffer capacity may also be determined that has a capacity based on the target utilization capacity. This buffer may allow the resource to perform at a level of utilization above the resource target utilization capacity. For example, the utilization buffer capacity may be set to 50% of the target utilization capacity, allowing the resource to perform up to 50% more operations when needed (e.g., during traffic spikes). The combined target capacity and buffer capacity of a resource may be referred to as that "operational" capacity of the resource.

The resource target utilization capacity and utilization buffer capacity may be adjusted as needed or desired. Such adjustments may be manual (e.g., in response to a customer request) and/or based on one or more criteria. For example, a utilization buffer capacity may be maintained at 50% of the resource utilization rate as determined over time. In such an example, a resource initially performing at a utilization rate of 10,000 operations per second on average (e.g., configured with a 10,000 operations per second target utilization capacity) may maintain a utilization buffer capacity of 5,000 operations per second (e.g., maintaining an operational capacity of 15,000 operations per second). When this resource begins to average 12,000 operations per second, the target capacity may be increased to 12,000 operations per second and/or the utilization buffer may be (e.g., automatically) increased to 6,000 operations per second, thereby increasing the operational capacity to 18,000 operations per second).

While automatically adjusting a utilization buffer capacity based on target utilization capacity and/or other utilization (e.g., current or historical utilization) may be helpful in ensuring that a resource has sufficient resources to perform bursts of increased performance (e.g. in response to sudden uptick in requests for operations), using set percentages and/or set buffer capacities may result in nonoptimal and/or inefficient allocation of resources.

For example, an organization that requires resources to perform millions of operations per second routinely may very seldom experience bursts of requests for operations. For instance, resources performing time-insensitive batch processing of transactions (e.g., batch processing of financial records) may be configured with a target utilization capacity of 10,000,000 operations per second, but may very rarely (e.g., never) experience levels of utilization that exceed 10,100,000 operations per second. In such cases, even a very low set percentage of utilization buffer capacity may be rarely used, resulting in inefficient use of (and payment for) such unused buffer capacity.

In another example, an organization that usually requires resources to routinely perform a few thousand operations per second may occasionally, but expectedly, experience relatively extreme bursts of requests for operations. For instance, resources performing time-sensitive one-off processing of operations (e.g., processing requests for bets on unpredictable events) may be configured with a target utilization capacity of 10,000 operations per second but may occasionally experience levels of utilization that exceed 500,000 operations per second. In such cases, even a very high set percentage of buffer capacity may not be sufficient, resulting in potential service disruption and failed operations due to inadequate buffer capacity.

In various embodiments, a buffer management system may be configured to (e.g., automatically) adjust a resource buffer based on one or more criteria associated with the resource's utilization level and within one or more bounds of buffer capacity. A buffer management system may determine a target capacity for a particular resource, for example based on buffer parameters provided in a customer request, historical average utilization, etc. Alternatively, a buffer management system may determine a current resource utilization for a particular resource. The buffer management system may be configured to maintain a buffer capacity for the resource based on the target capacity and/or current utilization. For example, the buffer management system may be configured (e.g., based on buffer parameters provided by a customer) to provision and/or maintain a buffer capacity of 50% of current resource utilization on a particular resource. The buffer management system may further be configured to provision the resource based on the buffer capacity and the current utilization (e.g., by providing the resource with an operational capacity substantially equivalent to the combined buffer capacity and current utilization).

The buffer management system may further be configured to maintain one or more buffer capacity bounds. Such bounds may be based on buffer parameters provided by a customer. For example, the buffer management system may be configured to maintain a minimum buffer capacity, even if the buffer capacity determined based on current utilization and/or target capacity is less than the minimum buffer capacity. For instance, a particular resource may currently have a utilization rate of 50,000 operations per second and may be configured with buffer parameters of a buffer capacity of 10% of current utilization and a minimum IOPS buffer capacity of 10,000 operations per second. In this example, because the minimum buffer capacity parameter is 10,000 operations per second, a buffer management system may provision 10,000 operations per second of buffer capacity even though the buffer capacity would be 5,000 operations per second using the buffer capacity parameter of 10% of current utilization.

The buffer management system may also, or instead, be configured to a maximum buffer capacity, even if the buffer capacity determined based on current utilization and/or target capacity is greater than the maximum buffer capacity. For instance, a particular resource may currently have a utilization rate of 1,000,000 operations per second and may be configured with buffer parameters of a buffer capacity of 5% of current utilization and a maximum buffer capacity of 25,000 operations per second. In this example, because the maximum buffer capacity parameter is 25,000 operations per second, a buffer management system may provision 25,000 operations per second of buffer capacity even though the buffer capacity would be 50,000 operations per second using the buffer capacity parameter of 5% of current utilization.

In various embodiments, the buffer management system may be configured to use both a minimum buffer capacity and a maximum buffer capacity (and/or associated parameters). For example, a buffer management system may be configured to (e.g., automatically) adjust a resource's buffer capacity while ensuring that the buffer capacity neither falls below a minimum buffer capacity nor rises above a maximum buffer capacity.

By providing the ability to (e.g., automatically) adjust resource buffers while ensuring that at least minimum buffers are available without allowing buffer to grow beyond a suitable size, the disclosed system and methods may provide a customers and system operators efficient means of configuring and scaling systems for improved performance while minimizing inefficiencies.

For example, a customer may be preparing to launch a new service and may request that a system operator configure a system to support this new service. The customer may anticipate an initially high level of system activity upon launch of the new service, with utilization tapering to a lower level over time. To address this anticipated pattern of requests for the new service (requests for operations) the parameters for the system may be configured (e.g., at a buffer management system) with an initial target IOPS capacity of 200 IOPS, an IOPS buffer of 50% of utilization, and a minimum IOPS buffer of 2,000 IOPS. Thus, this system will be provisioned for performing at least 2,200 IOPS at any given time (and potentially more based on utilization). This configuration will allow the customer's system to handle a large increase in IOPS from a minimal amount of IOPS. For example, before the customer's new service is publicized, the customer's system may be performing a minimal amount of IOPS. Once a public announcement is made that the customer's service is available, the requests for operations may increase rapidly. By ensuring that a significant buffer is available, the system will be prepared to process the new surge of requests for operations.

In another example, a customer may be operating a well-established service that rarely experiences bursts of traffic or rapid changes in requests for service (requests for operations). Such a customer may require a system that can consistently perform high number of operations over a long time period but may have little need for a large amount of excess system capacity. To address this anticipated pattern of requests for the established service (requests for operations) the parameters for the system may be configured (e.g., at a buffer management system) with a target IOPS capacity of 1,000,000 IOPS, a IOPS buffer of 10% of utilization, and a maximum IOPS buffer of 10,000 IOPS. Thus, this system may be provisioned for performing up to 1,010,000 IOPS at any given time (and potentially less based on utilization). This configuration will allow the customer's system to handle a constantly large number of IOPS while keeping the maximum number of total provisioned IOPS at an efficient level. For example, if the buffer size was set unbounded to 5% of utilization, the system may be provisioned at 1,100,000 IOPS under normal conditions. But if the system rarely performs more than 1,000,000 IOPS, there is a significant inefficacy (and cost) with maintaining 100,000 normally unused IOPS. By setting a boundary on the maximum buffer size for such a system, extra capacity may be provided without inefficiently allocating buffer capacity that is likely to go unused.

While the disclosed examples may describe buffers associated with operations performed by resources and measured in units of IOPS, other resource operations and properties are contemplated as within the scope of this disclosure. For example, the disclosed systems and methods may be used to provision and maintain memory capacity and buffers, network transmission capacity and buffers, processor capacity and buffers, etc. All such examples are contemplated as within the scope of the instant disclosure.

The techniques and systems described herein may be implemented in a number of ways. Example implementations are provided below with reference to the following figures.

FIG. 1 is a block diagram of an illustrative environment 100 that includes a buffer management system 102 that may include a buffer scaling service 104 and buffer parameters 106 (e.g., stored in a database or other data storage). The buffer management system 102 may facilitate user interaction and/or otherwise receive one or more buffer parameters for one or more resources with which the buffer management system 102 may communicate. Such parameters may be stored at the buffer parameters 106. One or more resources may be configured (e.g., via the buffer scaling service 104) by the buffer management system. Alternately or additionally, one or more resources may be provisioned based on resource buffers, such as IOPS buffers, as described herein. For example, one or more other systems may provision a resource based on data determined by the buffer management system 102. Alternately or additionally, one or more resources may otherwise be provisioned (e.g., a resource may request provisioning) based on data determined by the buffer management system 102. The environment 100 may further include a system 140 that may be a customer system provided and/or implemented by a service provider. The system 140 may include one or more of resources 141(1)-(X) that may each represent one or more physical and/or logical resources, such as one or more server computers, virtual machines, software resources, databases, data storage resources, notebooks clusters, datasets, etc., or any combination thereof. The buffer management system and/or associated services and systems may communicate or otherwise interact with one or more of the resources 141(1)-(X) configured at the system 140 via the network 116. The one or more of the resources 141(1)-(X) may receive resource configuration instructions or commands from the buffer management system 102. The one or more of the resources 141(1)-(X) may also transmit resource status data (e.g., current utilization data, buffer status data, buffer utilization data, alarms associated with buffers, and/or any other data associated with buffers) to the buffer management system 102.

One or more devices 110 may communicate or otherwise interact with the system 140 via one or more networks 116. The device(s) 110 may be any one or more user devices or other devices that may request services and/or operations from resources of the system 140. For example, the device(s) 110 may be mobile devices operated by users to interact with web sites hosted by one or more of the resources 141(1)-(X) configured at the system 140.

The operations requested by the device(s) 110 may be operations associated with resource utilization at one or more resources. This resource utilization may include the use of provisioned IOPS associated with a buffer. For example, the device(s) 110 may transmit one or more requested operations 150(1) via network(s) 116 to the resource 141(1). The resource 141(1) may perform the requested operations 150(1) (and, e.g., transmit responsive data to the requesting device(s)). The resource 141(1) may be configured with provisioned IOPS 142(1), which may include a utilization level of IOPS of utilization 143(1) and an IOPS buffer 144(1). In performing the requested operations 150(1), the resource 141(a) may include the operations in the utilization 143(1) of the resource 141(1). If necessary, the resource 141(1) may use IOPS within the buffer 144(1) to complete the requested operations 150(1). In some examples, if the buffer 144(1) is consumed (e.g., by performing other operations), the resource 141(1) may not perform the requested operations 150(1).

The resource 141(1) may provide IOPS, buffer, and/or utilization data to the buffer management system 102 by transmitting a resource status message 161 to the system 102. The message 161 may be transmitted via network 116 or via another connection. For example, the buffer management system 102 may be co-located with the system 140 in a data center and so may be communicatively connected within the data center. In such examples, communication between resources of the system 140 and the buffer management system 102 may not require an external network, such as network 116. In other examples, the buffer management system 102 may be remotely located from the resources of the system 140 and may therefore communicate with such resources via the network 116.

A resource status message, such as the resource status message 161, may be generated by a resource periodically, reporting utilization and/or buffer data of the resource on a regular basis. Alternatively, or in addition, the resource may generate a resource status message based on detecting one or more particular conditions. For example, the resource may detect that IOPS utilization has met, exceeded, or fallen below a threshold value and may, in response, generate a resource status message with utilization data. In another example, the resource may detect that IOPS buffer utilization has met or exceeded (or fell below) a threshold value and may, in response, generate a resource status message with buffer utilization data. Such messages may be associated with or referred to as "alarms" that may be used by the buffer management system 102 to address one or more conditions that may occur at a resource.

The buffer management system 102 may configure and/or otherwise instruct the resource 141(1) to provision and/or maintain an available level of resources that include buffers (e.g., based on buffer parameters 106) by transmitting a resource provisioning message 162 to the resource 141(1). The message 162 may also be transmitted directly (e.g., where the buffer management system 102 is co-located with the system 140) or via an external network (e.g., network 116). The message 162 may include instructions for adjusting the provisioned amount of resources based on the buffer utilization that may have been reported in the buffer status message 161 and a determined buffer size based on the buffer parameters associated with the resource 141(1) (e.g., stored in buffer parameters 106). Based on the resource provisioning message 162, the resource 141(1) may adjust (itself or via a provisioning request) the capacity of the 144(1) and/or the total provisioned IOPS 142(1). Note that the one or more resources 141(1)-(X) may adjust their provisioned capacity and other configurations directly or may request such adjustments from one or more other services or systems. Alternatively, the buffer management system 102 may adjust, or cause the adjustment of, resource buffers and other configurations via such one or more other services or systems rather than, or in addition, instructing the resources themselves to perform such adjustments.

In various examples, a resource provisioning message 162 may instruct, or request on behalf of, a resource to provision an operational capacity substantially equivalent to a target capacity and a buffer capacity determined by the buffer management system 102. In other examples, a resource provisioning message 162 may provide a target capacity and a buffer capacity determined by the buffer management system 102 to a resource or other system that may be used by the resource or other system to provision operational capacity for the resource that is substantially equivalent to the target capacity and the buffer capacity.

In an example, the utilization 143(1) may be the result of the resource 141(1) performing the requested operations 150(1). The resource 141(1) may report the utilization 143(1) to the buffer management system in the resource status message 161. In this message, the resource 141(1) may also include information about the current buffer capacity, historical IOPS and buffer utilization data, and/or any other data. The buffer management system 102 may determine, based on the buffer parameters 106 associated with the resource 141(1), that the buffer 144(1) is to be adjusted based on the utilization 143(1). The buffer management system 102 may further determine that an adjusted buffer capacity based on the associated buffer parameters is not greater than a maximum buffer capacity parameter associated with the resource 141(1) and/or is not less than a minimum buffer capacity parameter associated with the resource 141(1). Because the determined adjusted buffer capacity is within the buffer bounds for the resource 141(1), the buffer management system 102 may transmit the resource provisioning message 162 indicating that the provisioned IOPS 142(1) is to be set or maintained based on the determined adjusted buffer capacity and the utilization 143(1). The minimum buffer capacity parameter and maximum buffer capacity parameter associated with the resource 141(1) may also be stored in the buffer parameters 106.

Similarly, the utilization 143(2) of the resource 141(2) may be the result of the resource 141(2) performing the requested operations 150(2). In this example, the resource 141(2) may be receiving a relatively large number of requested operations 150(2), causing the utilization 143(2) of the provisioned IOPS 142(2) of the resource 141(2) to increase. The resource 141(2) may report the increased utilization 143(2) to the buffer management system 102, in some embodiments, along with information about the current buffer capacity 144(2), historical IOPS and buffer utilization data, and/or any other data. The buffer management system 102 may determine, based on the buffer parameters 106 associated with the resource 141(2), that the buffer 144(2) is to be adjusted based on the utilization 143(2). The buffer management system 102 may further determine that an adjusted buffer capacity for the buffer 144(2) based on the associated buffer parameters is greater than a maximum buffer capacity parameter associated with the resource 141(2). Because the determined adjusted buffer capacity is greater than the maximum buffer capacity parameter, the buffer management system 102 may transmit a resource provisioning message indicating that the provisioned IOPS 142(2) is to be set or maintained based on the capacity associated with the maximum buffer capacity parameter and the utilization 143(2). The maximum buffer capacity parameter associated with the resource 141(2) may also be stored in the buffer parameters 106.

In another example, the utilization 143(X) of the resource 141(X) may be the result of the resource 141(X) performing the requested operations 150(X). In this example, the resource 141(X) may be receiving a relatively small number of requested operations 150(X), causing the utilization 143(X) of the provisioned IOPS 142(X) of the resource 141(X) to decrease. The resource 141(X) may report the decreased utilization 143(X) to the buffer management system 102, in some embodiments, along with information about the current buffer capacity 144(X), historical IOPS and buffer utilization data, and/or any other data. The buffer management system 102 may determine, based on the buffer parameters 106 associated with the resource 141(X), that the buffer 144(X) is to be adjusted based on the utilization 143(X). The buffer management system 102 may further determine that an adjusted buffer capacity for the buffer 144(X) based on the associated buffer parameters is less than a minimum buffer capacity parameter associated with the resource 141(X). Because the determined adjusted buffer capacity is less than the minimum buffer capacity parameter, the buffer management system 102 may transmit a resource provisioning message indicating that the buffer 144(X) is to be set or maintained based on the capacity associated with the minimum buffer capacity parameter and the utilization 143(X). The minimum buffer capacity parameter associated with the resource 141(X) may also be stored in the buffer parameters 106. Additional systems and methods for determining a buffer capacity, an operational capacity, and associated adjustments are described in more detail herein.

The systems and methods described herein may be faster, more efficient, and more robust than conventional systems and methods, as they may facilitate efficient computing resource allocation and modification, including buffer allocation and modification, by reducing the operations allocated to particular resources that may not make use of such operations, while increasing the allocation of operations to resources that may need additional resources at times, thereby ensuring that resources are able to address unpredictable requests for operations. That is, the systems and methods described herein provide a technological improvement over existing resource buffer provisioning and modification processes that involve manually determining, setting, and modifying buffers, increasing the speed and efficiency of such buffer provisioning operations. Moreover, the systems and methods described herein provide a significant buffer capacity determination accuracy improvement because the buffer capacity may be determined and adjusted in real-time based on current utilization levels while ensuring that the buffer remains of sufficient size but not wastefully oversized.

By determining a buffer capacity based on current resource utilization while applying upper and lower bounds to any buffer capacity adjustments, processing requirements for requests for operations are reduced because such requests are less likely to be refused or ignored (and therefore requested again) due to lack of resource capacity. Accordingly, fewer processing and data storage resources are required to perform requested operations, and fewer network resources are needed to transmit and receive data associated with such operations. Furthermore, by using upper and/or lower bounds for resources buffers as described herein, while otherwise maintaining a buffer size based on a percentage of resource utilization, the disclosed systems and methods provide an efficient means of provisioning and adjusting resources and ensuring resource availability without wasting provisioning resources that are likely to go unused.

FIGS. 2-4 are representations of resources and associated provisioning, including provisioned operational IOPS, associated buffers and utilization levels, and applicable buffer parameters. FIGS. 2-4 illustrate exemplary IOPS and buffer provisioning that may be configured at one or more resources using the disclosed systems and methods. The exemplary representations in these figures may be described at times with reference to the environment 100 and one or more of the buffer management system 102, the system 140, and the resources 141(1)-(X), but these representations may also, or instead, represent configurations implemented in other similar and/or different environments by other similar and/or different systems.

FIG. 2 illustrates a diagrammatic representation of a resource 200, including buffer parameters 210 and provisioned IOPS 220 (other components omitted). Provisioned IOPS 220 may represent the operational capacity of the resource 200. The resource 200 may be in a particular provisioned state (e.g., at a particular point in time) and may have various applicable buffer parameters. For example, the buffer parameters 210 may indicate that a buffer size of 50% of the IOPS utilization is desired for the resource 200. The parameters 210 may further indicate a minimum buffer size of 2,000 IOPS and a maximum buffer size of 10,000 IOPS for the resource 200.

As shown in this figure, the currently provisioned IOPS 220 for the resource 200 is 9,000 IOPS. The currently provisioned IOPS 220 of 9,000 IOPS may be based on a current utilization 240 of 6,000 IOPS and the buffer 230 of 3,000 IOPS (e.g., 50% of current utilization of 6,000 IOPS). A buffer management system may have configured resource 200 with the operational capacity of 9,000 IOPS based on determining (e.g., receiving a notification) that the current utilization is 6,000 IOPS and that the determined preferred buffer size of 3,000 IOPS is within the buffer bounds of 2,000 IOPS and 10,000 IOPS.

FIG. 3 illustrates a diagrammatic representation of a resource 300, including buffer parameters 310 and provisioned IOPS 320 (other components omitted). Provisioned IOPS 320 may represent the operational capacity of the resource 300. The resource 300 may be in a particular provisioned state (e.g., at a particular point in time) and may have various applicable buffer parameters. For example, the buffer parameters 310 may include buffer parameters similar to those of the resource 200 in FIG. 2, indicating that a buffer size of 50% of the IOPS utilization is desired for the resource 300 with a minimum buffer size of 2,000 IOPS and a maximum buffer size of 10,000 IOPS for the resource 300.

As shown in this figure, the currently provisioned IOPS 320 for the resource 300 is 3,000 IOPS. The current utilization 340 of 1,000 IOPS of the resource 300 may indicate that, based on the buffer size parameter of the buffer parameters 310, that the buffer 330 should have a capacity of 500 IOPS (e.g., 50% of 1,000 IOPS). However, 500 IOPS is below the minimum buffer size of 2,000 IOPS. Therefore, a buffer management system may have configured resource 300 with an operational capacity of 3,000 IOPS based on a buffer capacity 330 of 2,000 IOPS (e.g., the minimum buffer size indicated in the buffer parameters 310) based on determining (e.g., receiving a notification) that the current utilization is 1,000 IOPS and that the determined preferred buffer size of 500 IOPS is less than the lower buffer bound of 2,000 IOPS. In various embodiments, when the determined candidate buffer capacity is less than a threshold minimum buffer capacity, a buffer management system may use a buffer capacity equal to the threshold minimum buffer capacity (e.g., combined with a current utilization) to determine the operational capacity for a resource. Alternatively, a buffer management system may use a buffer capacity that is substantially similar to the minimum buffer capacity and/or to a value that is based on the minimum buffer capacity.

FIG. 4 illustrates a diagrammatic representation of a resource 400, including buffer parameters 410 and provisioned IOPS 420 (other components omitted). Provisioned IOPS 420 may represent the operational capacity of the resource 400. The resource 400 may be in a particular provisioned state of (e.g., at a particular point in time) and may have various applicable buffer parameters. For example, the buffer parameters 410 may include buffer parameters similar to those of the resource 200 in FIG. 2 and the resource 300 in FIG. 3, indicating that a buffer size of 50% of the IOPS utilization is desired for the resource 400 with a minimum buffer size of 2,000 IOPS and a maximum buffer size of 10,000 IOPS for the resource 400.

As shown in this figure, the currently provisioned IOPS 420 for the resource 400 is 10,010,000 IOPS. The current utilization 440 of 10,000,000 IOPS of the resource 400 may indicate that, based on the buffer size parameter of the buffer parameters 410, that the buffer 430 should have a capacity of 5,000,000 IOPS (e.g., 50% of 10,000,000 IOPS). However, 5,000,000 IOPS is above the maximum buffer size of 10,000 IOPS. Therefore, a buffer management system may have configured resource 400 to have an operational capacity of 10,010,000 IOPS based on a buffer capacity 430 of 10,000 IOPS (e.g., the maximum buffer size indicated in the buffer parameters 410) based on determining (e.g., receiving a notification) that the current utilization is 10,000,000 IOPS and that the determined candidate buffer size of 5,000,000 IOPS is greater than the upper buffer bound of 10,000 IOPS. In various embodiments, when the determined candidate buffer capacity is greater than a threshold maximum buffer capacity, a buffer management system may use a buffer capacity equal to the threshold maximum buffer capacity (e.g., combined with a current utilization) to determine the operational capacity for a resource. Alternatively, a buffer management system may use a buffer capacity that is substantially similar to the maximum buffer capacity and/or to a value that is based on the maximum buffer capacity.

Figure 5:
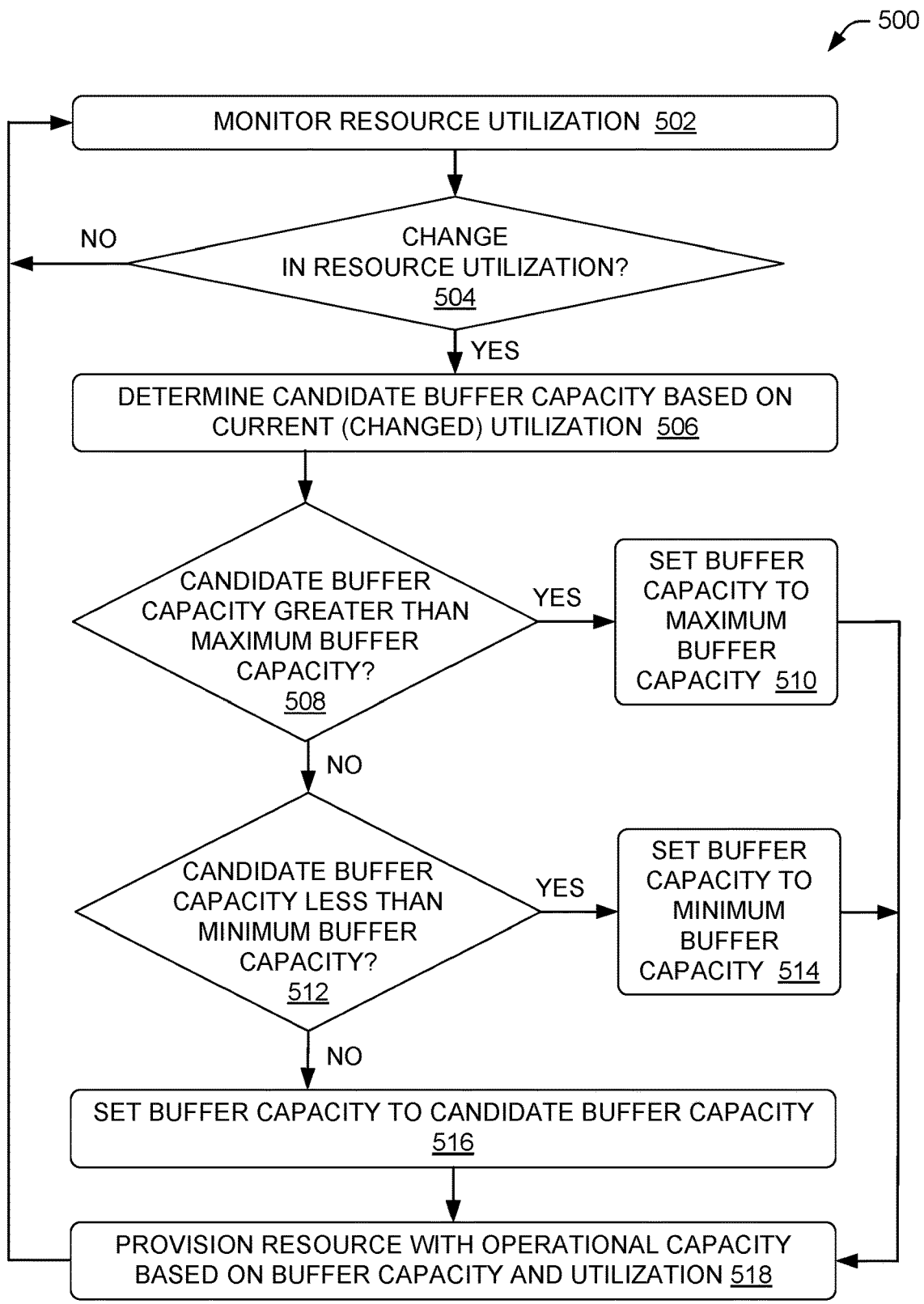
FIG. 5 illustrates a flow diagram of an example method for resource buffer scaling.

FIG. 5 is a flow diagram of an exemplary process 500 illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Furthermore, any subset of the described blocks may be in isolation and/or with any other operations without departing from the scope of the instant disclosure.

More specifically, FIG. 5 is a flow diagram of an illustrative process 500 to monitor and adjust a buffer capacity and/or operational capacity of one or more resources. The process 500 may be described at times with reference to the environment 100 and may be performed by the buffer management system 102, but the process 500 may also, or instead, be performed in other similar and/or different environments by other similar and/or different systems.

The examples set forth above will be used to further illustrate the process 500 but are not intended to limit the scope or the embodiments set forth in the instant disclosure in any way. In the first example, a customer ("new service customer") may be preparing to launch a new service and may anticipate a high level of system activity upon launch with utilization tapering over time. To address this anticipated pattern of requests for the new service (requests for operations) a resource in the customer's system may be provisioned using the parameters of an initial target IOPS capacity of 200 IOPS, an IOPS buffer of 50% of utilization, and a minimum IOPS buffer of 2,000 IOPS. In the second example, a customer ("established service customer") operating a well-established service that rarely experiences bursts of traffic or rapid changes in requests for service be associated with a system that includes a resource that may be provisioned using the parameters of a target IOPS capacity of 1,000,000 IOPS, a IOPS buffer of 10% of utilization, and a maximum IOPS buffer of 10,000 IOPS.

At 502, a buffer management system may monitor the utilization of one or more resources configured in a system.

For example, a buffer management system (e.g., buffer management system 102 of FIG. 1) and/or service (e.g., buffer scaling service 104 of FIG. 1) as described herein may proactively monitor a system that is operated on behalf of a customer by receiving regular and/or periodic status updates from resources configured in the system and/or by regularly and/or periodically querying resources in such a system. The buffer management system and/or service may also, or instead, receive system utilization level status updates that provide information about multiple resources in the system and/or summary information associated with one or more resources configured in the system. Status updates may include any one or more of an indication of a current level of utilization of a resource in the system, a buffer utilization level, a current resource configuration, a current buffer configuration, one or more parameters, etc. Such levels and configurations may be indicated in IOPS and/or any other suitable units.

Alternately or additionally, a buffer management system and/or service may be configured to receive notifications, alarms, and/or other transmissions from one or more resources configured in a system when one or more such resources in the system detect a particular condition. For example, a resource may be configured to transmit a notification to a buffer management system when the resource utilization level changes. In some examples, any resource utilization change may be reported, while in other examples, changes in utilization may be reported when such changes meet or exceed a threshold. For example, a resource may be configured to transmit a notification to a buffer management system when the utilization increases and/or decreases by a threshold percentage (5%, 10%, 15%, etc.) over a period of time (five seconds, ten minutes, an hour, etc.). The system may also, or instead, be configured to transmit system level status updates that provide information about multiple resources in the system and/or summary information associated with one or more resources configured in the system based on one or more conditions being met. For example, the system may transmit a summary alarm notification when a threshold number of resources (e.g., two, three, ten, etc.) have experienced a (e.g., threshold amount of) resource utilization change. Status notifications and/or alarms may include any one or more of an indication of a current level of utilization of a resource in the system, a buffer utilization level, a current resource configuration, a current buffer configuration, etc. Here again, such levels and configurations may be indicated in IOPS and/or any other suitable units.

At 504, the buffer management system may determine if there has been a change in resource utilization and/or if a change in resource utilization is sufficiently significant. For example, at 504 the buffer management system may evaluate a resource status update received from a resource to determine if the utilization indicated in the update is different from a utilization reported for that resource previously (e.g., in a previous status update for which that the buffer management system may have received and/or stored data). In other examples, the buffer management system may receive a notification from a resource that its utilization has changed initiated based on the resource detecting the change (e.g., as opposed to periodic updates). If the utilization has changed, the buffer management system may determine at 504 whether the change meets a threshold amount of change (e.g., a minimum amount of utilization change). In some examples, the thresholds for utilization increase and decrease may be a same threshold, while in other examples different thresholds may be used for utilization increase and decrease. In other examples, at 504 the buffer management system may determine whether any amount of utilization change has occurred.

If, at 504, there has been no change in resource utilization, or if a change in resource utilization has not been sufficiently significant (e.g., increased by a threshold amount, decreased by a threshold amount, etc.), the process 500 may return to 502 to continue monitoring resource utilization.

If, at 504, the buffer management system has determined that there has been a (sufficiently significant) change in resource utilization, at 506 the buffer management system may determine a candidate buffer capacity based on the changed (e.g., currently reported) resource utilization. The candidate buffer capacity may be based on buffer parameters associated with the resource (e.g., buffer parameters 106 of FIG. 1). For example, a buffer capacity parameter for a particular resource may be 25% of resource utilization. If this resource reports a utilization of 40,000 IOPS (and, in some examples, the buffer management system determines that this is a sufficiently significant change in utilization), the buffer management system may determine that a candidate buffer capacity for this resource is 10,000 IOPS.

For the new service customer example introduced above, at 506 the buffer management system may determine a candidate buffer capacity of 50% of the utilization determined at 502. For the established service customer example introduced above, at 506 the buffer management system may determine a candidate buffer capacity of 10% of the utilization determined at 502.

At 508, the buffer management system may determine whether the candidate buffer capacity determined at 506 is greater than a maximum buffer capacity associated with the resource. The maximum buffer capacity may be based on buffer parameters associated with the resource (e.g., buffer parameters 106 of FIG. 1). For example, a maximum buffer capacity parameter for a particular resource may be 5,000 IOPS. If this resource has a buffer capacity parameter of 25% of utilization and the current utilization of this resource is 40,000 IOPS, the candidate buffer capacity for this resource determined at 506 may be 10,000 IOPS, which is greater than the maximum buffer capacity parameter. Alternatively, the maximum buffer capacity parameter for the particular resource may be 20,000 IOPS. In this case, the candidate buffer capacity of 10,000 IOPS would not exceed a maximum buffer capacity parameter of 20,000 IOPS.

For the new service customer example, at 508 the buffer management system may determine whether the candidate buffer capacity of 50% of the utilization determined at 502 is greater than a maximum buffer capacity associated with the particular resource. In some embodiments, there may be no maximum buffer capacity set for a particular resource. For example, the new service customer may wish to service all requests that are received regardless of capacity used so that no potential new users are denied service. In such embodiments, the resource's buffer capacity may be configured to increase based on utilization without bounds.

For the established service customer example, at 508 the buffer management system may determine whether a candidate buffer capacity of 10% of the utilization determined at 502 exceeds the maximum buffer capacity of 10,000.

If, at 508, the buffer management determines that the candidate buffer capacity determined at 506 is greater than a maximum buffer capacity associated with the resource, at 510 the buffer management system may set the buffer capacity to the maximum buffer capacity associated with the resource. The buffer management system may then, at 518, provision the resource with an operational buffer capacity substantially equivalent to (e.g., equal to the sum of) the maximum buffer capacity and a target capacity based on the utilization determined at 502. The buffer management system may also or alternatively take one or more actions to cause the resource to be configured with this operational capacity (equal to the maximum buffer capacity and the current utilization) at operation 518. The process 500 may return to 502 to continue to monitor the resource and/or system.

For the new service customer example, at 510 the buffer management system may set the buffer capacity to a maximum buffer capacity associated with the respective resource if the candidate buffer capacity exceeded that maximum buffer capacity. For the established service customer example, at 510 the buffer management system may set the buffer capacity to maximum buffer capacity of 10,000 IOPS if the candidate buffer capacity exceeded 10,000 IOPS.

If, at 508, the buffer management determines that the candidate buffer capacity determined at 506 is not greater than a maximum buffer capacity associated with the resource, at 512 the buffer management system may determine whether the candidate buffer capacity determined at 506 is less than a minimum buffer capacity associated with the resource. The minimum buffer capacity may be based on buffer parameters associated with the resource (e.g., buffer parameters 106 of FIG. 1). For example, a minimum buffer capacity parameter for a particular resource may be 20,000 IOPS. If the buffer capacity parameter for this resource is 25% of utilization and the current utilization is 40,000 IOPS, the candidate buffer capacity for this resource determined at 506 is 10,000 IOPS. In this case, the candidate buffer capacity is less than the minimum buffer capacity parameter of 20,000 IOPS. Alternatively, the minimum buffer capacity parameter for the particular resource may be 5,000 IOPS. In this case, the candidate buffer capacity of 10,000 IOPS would not be less than a minimum buffer capacity parameter of 5,000 IOPS.

For the new service customer example, at 512 the buffer management system may determine whether the candidate buffer capacity of 50% of the utilization determined at 502 is less than the minimum buffer capacity of 2,000 IOPS.

For the established service customer example, at 512 the buffer management system may determine whether the candidate buffer capacity of 10% of the utilization determined at 502 is less than a minimum buffer capacity associated with the respective resource. In some embodiments, there may be no minimum buffer capacity set for a particular resource. For example, the established service customer may wish to allow the buffer to decline based on utilization because the utilization is at a consistent level and few surges of traffic are expected. In such embodiments, the resource's buffer capacity may be configured to decrease based on utilization without bounds.

If, at 512, the buffer management determines that the candidate buffer capacity determined at 506 is less than a minimum buffer capacity associated with the resource, at 514 the buffer management system may set the buffer capacity to the minimum buffer capacity associated with the resource. The buffer management system may then, at 518, provision the resource with an operational buffer capacity substantially equivalent to (e.g., equal to the sum of) the minimum buffer capacity and a target capacity based on the utilization determined at 502. The buffer management system may also or alternatively take one or more actions to cause the resource to be configured with this operational capacity (equal to the minimum buffer capacity and the current utilization) at operation 518. The process 500 may return to 502 to continue to monitor the resource and/or system.

If, at 512, the buffer management determines that the candidate buffer capacity determined at 506 is not less than a minimum buffer capacity associated with the resource, at 516 the buffer management system may set the buffer capacity to the candidate buffer capacity associated with the resource.

For the new service customer example, at 514 the buffer management system may set the buffer capacity to the minimum buffer capacity of 2,000 IOPS if the candidate buffer capacity was less than 2,000 IOPS. Otherwise, at 516 the buffer management system may set the buffer capacity to the candidate buffer capacity of 50% of the utilization determined at 502.

For the established service customer example, at 514 the buffer management system may set the buffer capacity to a minimum buffer capacity associated with the respective resource if the candidate buffer capacity was less than that minimum buffer capacity. Otherwise, at 516 the buffer management system may set the buffer capacity to the candidate buffer capacity of 10% of the utilization determined at 502.

At 518, regardless of the basis of the determined buffer capacity, the buffer management system may determine an operational capacity for a resource based on the buffer capacity and the utilization. The buffer management system may then provision the resource based on this operational capacity value and/or take one or more actions to cause the resource to be configured with the operational capacity. The process 500 may return to 502 to continue to monitor the resource and/or system.

Figure 6:
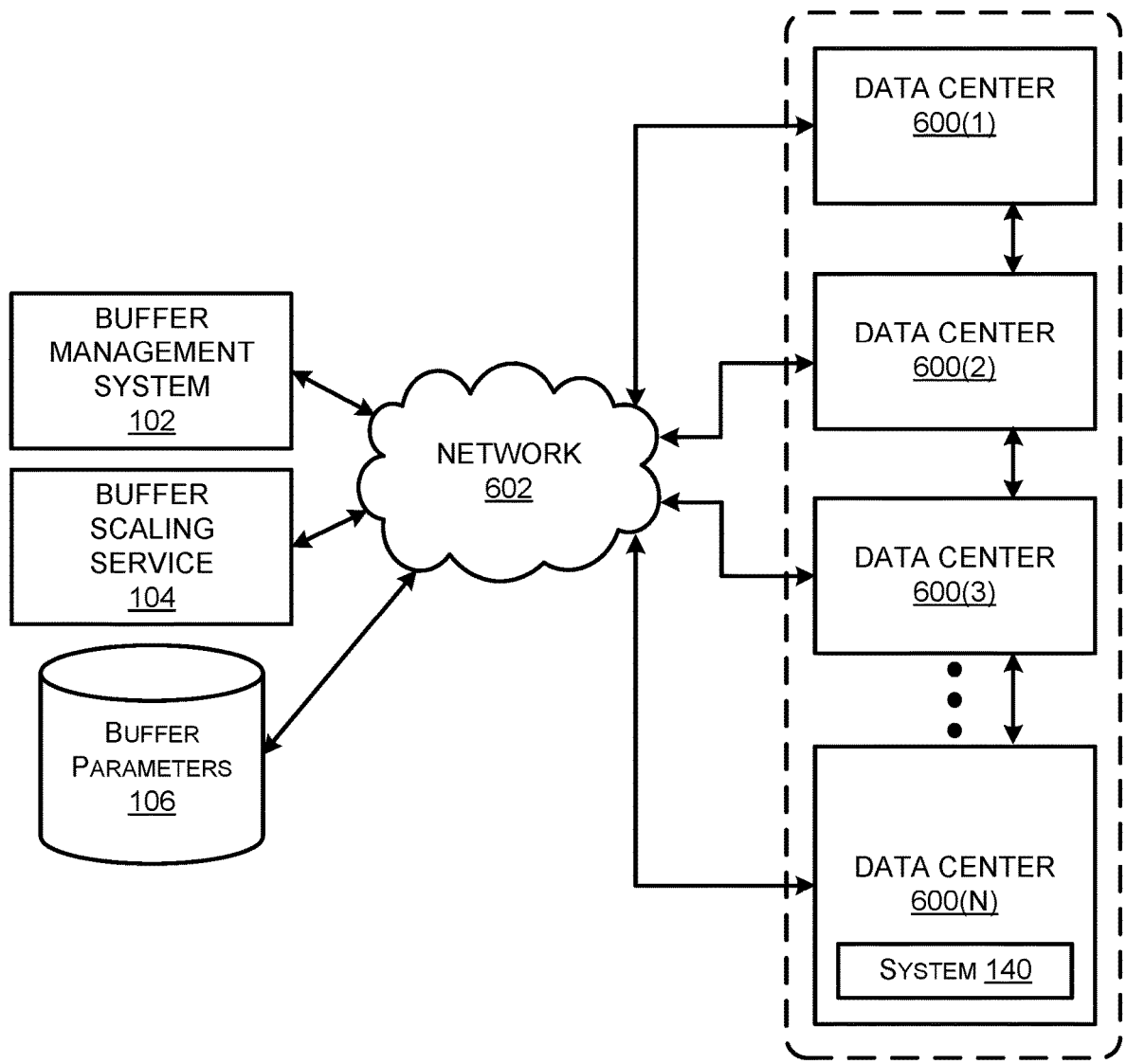
FIG. 6 is a system and network diagram that shows an illustrative operating environment that includes a system that can be configured to implement aspects of the functionality described herein.

FIG. 6 is a system and network diagram that shows an illustrative operating environment that includes a buffer management system 102, a buffer scaling service 104, buffer parameters 106, and a system 140 that can be configured to implement aspects of the functionality described herein. The system 140 can execute various types of computing and network services and/or resources, such as the data storage and data processing, and/or provide computing resources for various types of systems on a permanent or an as-needed basis. Among other types of functionality, the resources provided by the system 140, or by a larger system of which the system is a part, such as the buffer management system 102, the buffer scaling service 104, and the buffer parameters 106, can be utilized to implement the various buffer management and change automation services described herein. As also discussed above, the system 140 may be part of a larger system that provides the additional computing resources that include, without limitation, data storage resources, data processing resources, such as virtual machine (VM) instances, networking resources, data communication resources, network services, and other types of resources.

Each type of computing resource provided by the system 140, or by a larger system of which the system is a part, including the buffer management system 102, the buffer scaling service 104, and the buffer parameters 106, can be general-purpose or can be available in a number of specific configurations. For example, data processing resources can be available as physical computers or VM instances in a number of different configurations. The VM instances can be configured to execute applications, including web servers, application servers, media servers, database servers, some or all of the buffer management and change automation services described above, and/or other types of programs. Data storage resources can include file storage devices, block storage devices, and the like. The system 140, or a larger system of which the system is a part, can also be configured to provide other types of computing resources not mentioned specifically herein.

The resources provided by system 140, or a larger system of which the system is a part, are enabled in one implementation by one or more data centers 600(1), 600(2), 600(3), . . . , 600(N). The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 7

The users of the system can access the computing resources, such as the buffer management system 102, the buffer scaling service 104, the buffer parameters 106, and/or any of the resources of system 140, provided by the system over a network 602, which can be a wide area communication network ("WAN"), such as the Internet, an intranet, an Internet service provider ("ISP") network, or a combination of such networks. For example, and without limitation, a computing device (e.g., the buffer management system 102) operated by a user of the system can be utilized to access the system by way of the network 602. It should be appreciated that a local-area network ("LAN"), the Internet, or any other networking topology known in the art that connects the data centers to remote users and other users can be utilized. It should also be appreciated that combinations of such networks can also be utilized.

Figure 7:
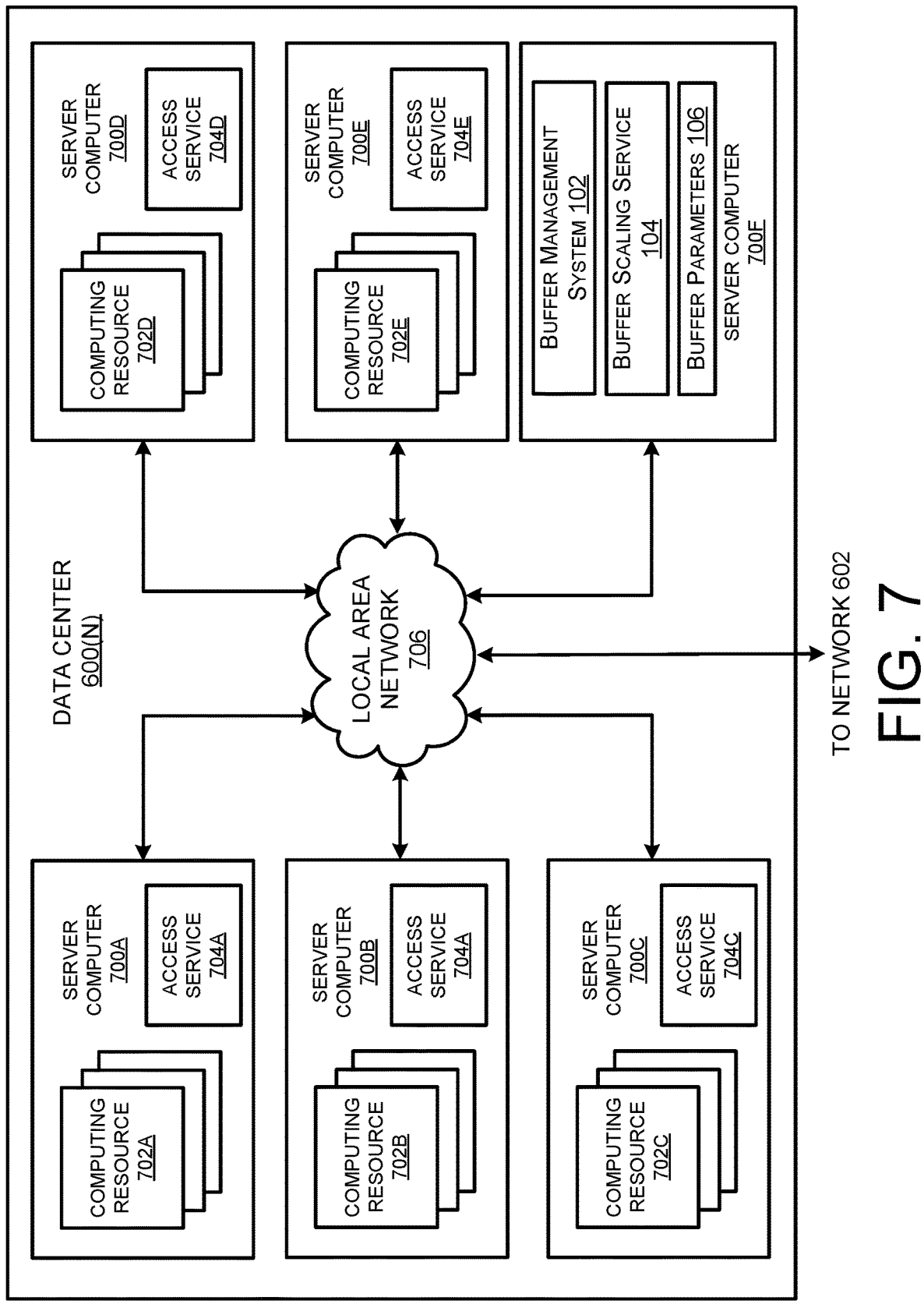
FIG. 7 is a computing system diagram illustrating a configuration for a data center that can be utilized to implement aspects of the technologies disclosed herein.

FIG. 7 is a computing system diagram that illustrates one configuration for a data center 600(N) that can be utilized to implement the system 140, the buffer management system 102, the buffer scaling service 104, and/or the buffer parameters 106, as described above in FIGS. 1-6 and/or any other buffer management and change automation services disclosed herein, or any other resources described herein, such as the resources 114. The example data center 600(N) shown in FIG. 7 includes several server computers 700A-700E (collectively 700) for providing the computing resources 702A-702E (collectively 702), respectively.

The server computers 700 can be standard tower, rackmount, or blade server computers configured appropriately for providing the various computing resources described herein (illustrated in FIG. 7 as the computing resources 702A-702E). As mentioned above, the computing resources 702 provided by the system 140, or a larger system of which the system is a part, can include, without limitation, analytics applications, data storage resources, data processing resources such as VM instances or hardware computing systems, database resources, networking resources, and others. Some of the servers 700 can also be configured to execute services (e.g., access services) 704A-704E (collectively 704) capable of instantiating, providing, and/or managing the computing resources 702, some of which are described in detail herein.

The data center 600(N) shown in FIG. 7 also includes a server computer 700F that can execute some or all of the software components described above. For example, and without limitation, the server computer 700F can be configured to execute one or more of the buffer management system 102, the buffer scaling service 104, and the buffer parameters 106. The server computer 700F can also be configured to execute other components and/or to store data for providing some or all of the functionality described herein. In this regard, it should be appreciated that components or different instances of one or more of the buffer management system 102, the buffer scaling service 104, and the buffer parameters 106 can execute on many other physical or virtual servers in the data centers 600 in various configurations.

In the example data center 600(N) shown in FIG. 7, an appropriate LAN 706 is also utilized to interconnect the server computers 700A-700F. The LAN 706 is also connected to the network 602 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 600(1)-(N), between each of the server computers 700A-700F in each data center 600(N), and, potentially, between computing resources 702 in each of the data centers 600. It should be appreciated that the configuration of the data center 600(N) described with reference to FIG. 7 is merely illustrative and that other implementations can be utilized.

Figure 8:
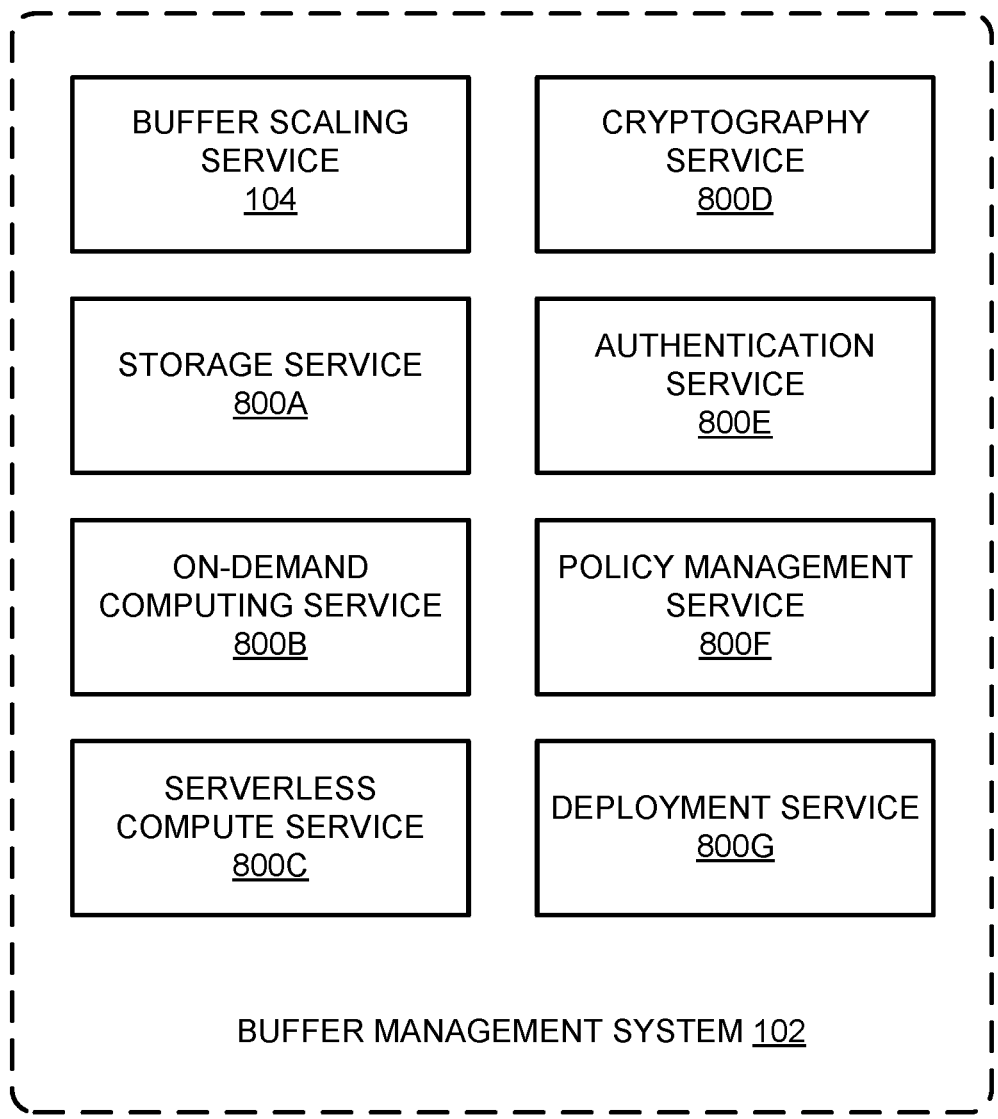
FIG. 8 is a network services diagram that shows aspects of several services that can be provided by and utilized within a system, or a larger system of which the system is a part, which is configured to implement the various technologies disclosed herein.

FIG. 8 is a system services diagram that shows aspects of several services that can be provided by and utilized within the buffer management system 102, the system 140, and/or a larger system of which these systems may be a part, which is configured to implement the various technologies disclosed herein. In particular, and as discussed above, the system, or a larger system of which the system is a part, can provide a variety of services to users and other users including, but not limited to, the buffer scaling service 104 and/or a computing instance performing one or more functions thereof, a storage service 800A that may include the buffer parameters 106 and/or a computing instance performing one or more functions thereof, an on-demand computing service 800B, a serverless compute service 800C, a cryptography service 800D, an authentication service 800E, a policy management service 800F, and a deployment service 800G. The system, or a larger system of which the system is a part, can also provide other types of computing services, some of which are described below.

It is also noted that not all configurations described include the services shown in FIG. 8 and that additional services can be provided in addition to, or as an alternative to, the services explicitly described herein. Each of the systems and services shown in FIG. 8 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 8 will now be provided.

The storage service 800A can be a network-based storage service that stores data obtained from users of the system and/or from computing resources in the system, or a larger system of which the system is a part. The data stored by the storage service 800A can be obtained from computing devices of users. The data stored by the storage service 800A may also be activity data logged to the storage system 800A that may be functioning as a logging system or service, for example for logging resource utilization, buffer utilization, and/or changes thereto.

The on-demand computing service 800B can be a collection of computing resources configured to instantiate VM instances and to provide other types of computing resources on demand. For example, a user of the system, or a larger system of which the system is a part, can interact with the on-demand computing service 800B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 800B is shown in FIG. 8, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 800C is a network service that allows users to execute code (which might be referred to herein as a "function") without provisioning or managing server computers in the system, or a larger system of which the system is a part. Rather, the serverless compute service 800C can automatically run code in response to the occurrence of events. The code that is executed can be stored by the storage service 800A or in another network accessible location.

In this regard, it is to be appreciated that the term "serverless compute service" as used herein is not intended to infer that servers are not utilized to execute the program code, but rather that the serverless compute service 800C enables code to be executed without requiring a user to provision or manage server computers. The serverless compute service 800C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 800D. The cryptography service 800D can utilize storage services of the system, or a larger system of which the system is a part, such as the storage service 800A, to store encryption keys in encrypted form, whereby the keys can be usable to decrypt user keys accessible only to particular devices of the cryptography service 800D. The cryptography service 800D can also provide other types of functionality not specifically mentioned herein.

The system, or a larger system of which the system is a part, in various configurations, also includes an authentication service 800E and a policy management service 800F. The authentication service 800E, in one example, is a computer system (e.g., collection of computing resources 800B) configured to perform operations involved in authentication of users or customers. For instance, one of the services shown in FIG. 8 can provide information from a user or customer to the authentication service 800E to receive information in return that indicates whether or not the requests submitted by the user or the customer are authentic.

The policy management service 800F, in one example, is a network service configured to manage policies on behalf of users or customers of the system, or a larger system of which the system is a part. The policy management service 800F can include an interface (e.g. API or GUI) that enables customers to submit requests related to the management of policy, such as a security policy. Such requests can, for instance, be requests to add, delete, change, or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 800G for deploying program code in some configurations. The deployment service 800G provides functionality for deploying program code, such as to virtual or physical hosts provided by the on-demand computing service 800B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 9:
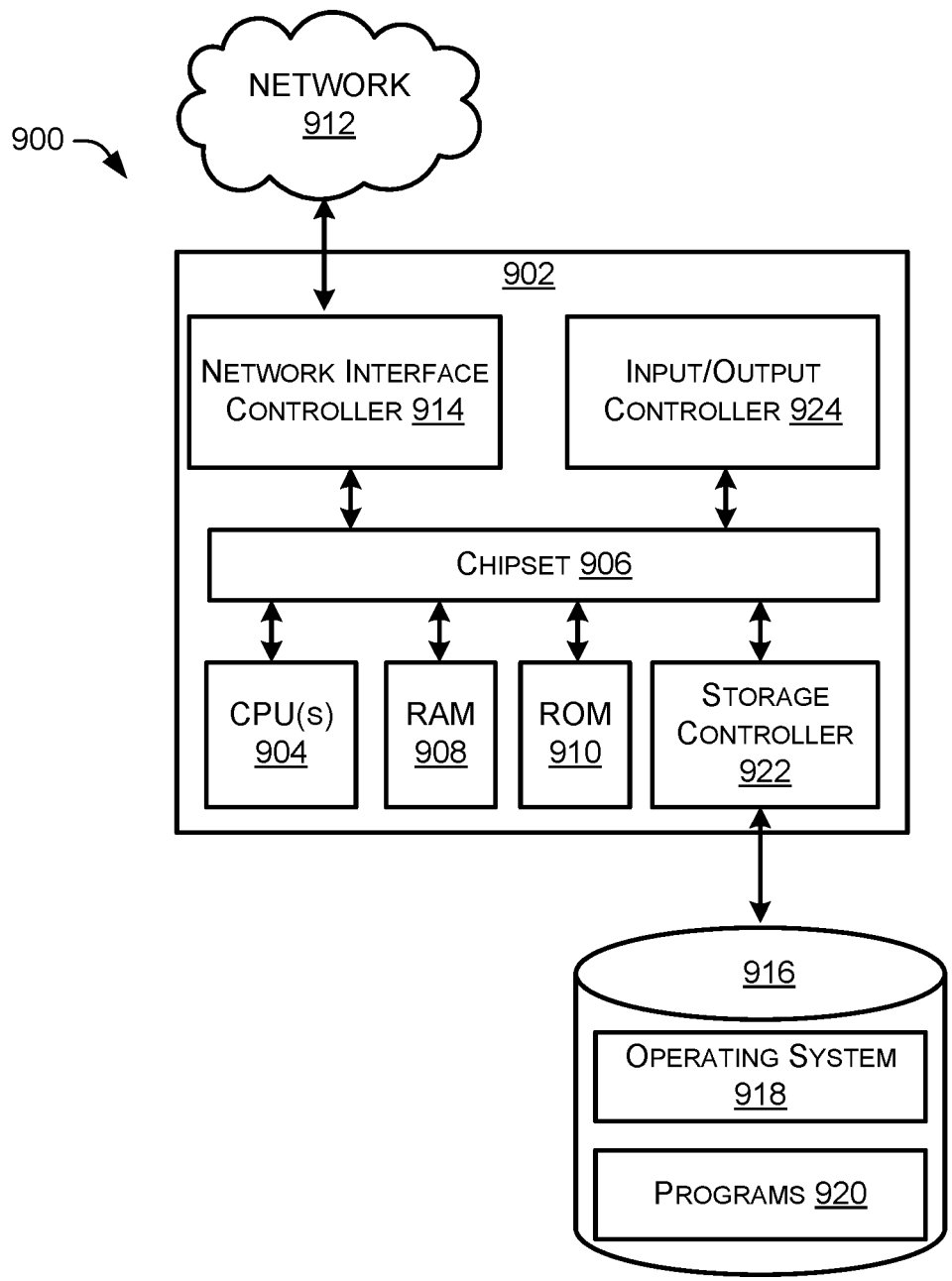
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. The computer 900 may represent architecture for a naming service, a concentrator, a reader, and/or other devices described herein.

The computer 900 includes a baseboard 902, or "motherboard," which may be one or more printed circuit boards to which a multitude of components and/or devices may be connected by way of a system bus and/or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 912. The chipset 906 can include functionality for providing network connectivity through a network interface controller (NIC) 914, such as a gigabit Ethernet adapter. The NIC 914 is capable of connecting the computer 900 to other computing devices over the network 912. It should be appreciated that multiple NICs 914 can be present in the computer 900, connecting the computer to other types of networks and remote computer systems.

The computer 900 can be connected to a mass storage device 916 that provides non-volatile storage for the computer. The mass storage device 916 can store an operating system 918, programs 920, and data, which have been described in greater detail herein. The mass storage device 916 can be connected to the computer 900 through a storage controller 922 connected to the chipset 906. The mass storage device 916 can consist of one or more physical storage units. The storage controller 922 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 916 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 916 is characterized as primary or secondary storage, and the like.

For example, the computer 900 can store information to the mass storage device 916 by issuing instructions through the storage controller 922 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 916 by detecting the physical states or characteristics of one or more particular locations within the physical storage units.

In addition to the mass storage device 916 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 916 can store an operating system 918 utilized to control the operation of the computer 900. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 916 can store other system or application programs and data utilized by the computer 900.

In one configuration, the mass storage device 916 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various processes described above. The computer 900 can also include computer-readable storage media for performing any of the other computer-implemented operations described herein.

The computer 900 can also include one or more input/output controllers 924 for receiving and processing input from a number of input devices, such as a keyboard, a mouse, a touchpad, a touch screen, an electronic stylus, or other type of input device. Similarly, an input/output controller 924 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Based on the foregoing, it should be appreciated that technologies for providing closed loop change management services and sorting and retrieving activity data based on a session identifier have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:
   receiving, at a buffer management system, an indication of a current utilization associated with a computing resource;
   determining, by the buffer management system, a plurality of buffer parameters associated with the computing resource, the plurality of buffer parameters comprising:
      a utilization buffer capacity comprising a percentage of a utilization level;
      a minimum utilization buffer capacity; and
      a maximum utilization buffer capacity;
   determining, by the buffer management system, a candidate utilization buffer capacity using the percentage of the utilization level and the current utilization;
   determining, by the buffer management system, that the candidate utilization buffer capacity is greater than the minimum utilization buffer capacity;
   determining, by the buffer management system, that the candidate utilization buffer capacity is less than the maximum utilization buffer capacity;
   based on determining that the candidate utilization buffer capacity is greater than the minimum utilization buffer capacity and that the candidate utilization buffer capacity is less than the maximum utilization buffer capacity, determining an operational utilization capacity equal to a sum of the candidate utilization buffer capacity and the current utilization; and
   provisioning the operational utilization capacity at the computing resource.

2. The method of claim 1, further comprising:
   receiving, at the buffer management system, a second indication of a second current utilization associated with the computing resource;
   determining, by the buffer management system, a second candidate utilization buffer capacity using the percentage of the utilization level and the second current utilization;
   determining, by the buffer management system, that the second candidate utilization buffer capacity is less than the minimum utilization buffer capacity;
   based on determining that the candidate utilization buffer capacity is less than the minimum utilization buffer capacity, determining a second operational utilization capacity equal to a second sum of the minimum utilization buffer capacity and the second current utilization; and
   provisioning the second operational utilization capacity at the computing resource.

3. The method of claim 1, further comprising:
   receiving, at the buffer management system, a second indication of a second current utilization associated with the computing resource;
   determining, by the buffer management system, a second candidate utilization buffer capacity using the percentage of the utilization level and the second current utilization;
   determining, by the buffer management system, that the second candidate utilization buffer capacity is greater than the maximum utilization buffer capacity;
   based on determining that the second candidate utilization buffer capacity is greater than the maximum utilization buffer capacity, determining a second operational utilization capacity equal to a second sum of the maximum utilization buffer capacity and the second current utilization; and
   provisioning the second operational utilization capacity at the computing resource.

4. A method comprising:
   receiving, at a buffer management system, an indication of a current utilization level of a computing resource;
   determining, by the buffer management system, a plurality of buffer parameters associated with the computing resource, the plurality of buffer parameters comprising a buffer capacity parameter and one or more buffer bounds parameters;
   determining, by the buffer management system and based at least in part on the buffer capacity parameter and the current utilization level, a candidate buffer capacity;
   determining, by the buffer management system, that the candidate buffer capacity is within one or more buffer bounds based at least in part on the one or more buffer bounds parameters; and
   based at least in part on determining that the candidate buffer capacity is within the one or more buffer bounds, configuring an operational capacity at the computing resource based at least in part on the candidate buffer capacity.

5. The method of claim 4, further comprising:
   receiving, at the buffer management system, a second indication of a second current utilization level of the computing resource;
   determining, by the buffer management system and based at least in part on the buffer capacity parameter and the second current utilization level, a second candidate buffer capacity;
   determining, by the buffer management system, that the second candidate buffer capacity is outside the one or more buffer bounds based at least in part on the one or more buffer bounds parameters; and
   based at least in part on determining that the second candidate buffer capacity is outside the one or more buffer bounds, configuring a second operational capacity at the computing resource based at least in part on the one or more buffer bounds parameters.

6. The method of claim 5, wherein:
   the one or more buffer bounds comprises a minimum buffer capacity;
   determining that the second candidate buffer capacity is outside the one or more buffer bounds comprises determining that the second candidate buffer capacity is less than the minimum buffer capacity; and
   based at least in part on determining that the second candidate buffer capacity is less than the minimum buffer capacity, configuring the second operational capacity to be substantially equal to a sum of the minimum buffer capacity and the second current utilization level.

7. The method of claim 5, further comprising:
   the one or more buffer bounds comprises a maximum buffer capacity;
   determining that the second candidate buffer capacity is outside the one or more buffer bounds comprises determining that the second candidate buffer capacity is greater than the maximum buffer capacity; and based at least in part on determining that the second candidate buffer capacity is greater than the maximum buffer capacity, configuring the second operational capacity to be substantially equal to a sum of the maximum buffer capacity and the second current utilization level.

8. The method of claim 4, wherein receiving the indication of the current utilization level comprises:

transmitting a utilization query to the computing resource; and receiving a response from the computing resource, the response comprising the indication of the current utilization level.

9. The method of claim 4, wherein receiving the indication of the current utilization level comprises detecting a utilization alarm associated with the computing resource, and further comprising:

based at least in part on detection the utilization alarm, determining the current utilization level.

10. The method of claim 4, wherein the current utilization level comprises a number of input/output operations per second (IOPS) performed by the computing resource.

11. The method of claim 4, wherein the one or more buffer bounds parameters comprise a maximum buffer capacity parameter and a minimum buffer capacity parameter.

12. The method of claim 11, wherein:

the maximum buffer capacity parameter indicates a first number of input/output operations per second (IOPS); and the minimum buffer capacity parameter indicates a second number of IOPS that is less than the first number of IOPS.

13. The method of claim 4, wherein:

the buffer capacity parameter indicates a percentage of a utilization level; and determining the candidate buffer capacity comprises determining the candidate buffer capacity based at least in part on the percentage of the utilization level and the current utilization level.

14. A system comprising:

one or more processors; and one or more computer-readable media storing computer-executable instructions that, when executed by the one or more processors, cause a management system component to perform operations comprising:

receiving, at a buffer management system, an indication of a current utilization level of a computing resource;

determining, by the buffer management system, a plurality of buffer parameters associated with the computing resource, the plurality of buffer parameters comprising a buffer capacity parameter and one or more buffer bounds parameters:

determining, by the buffer management system and based at least in part on the buffer capacity parameter and the current utilization level, a candidate buffer capacity;

determining, by the buffer management system, that the candidate buffer capacity is outside one or more buffer bounds based at least in part on the one or more buffer bounds parameters; and based at least in part on determining that the candidate buffer capacity is not within the one or more buffer bounds, configuring an operational capacity at the computing resource based at least in part on the one or more buffer bounds parameters.

15. The system of claim 14, wherein the indication of the current utilization level is based at least in part on the computing resource detecting a change in a number of operations performed at the computing resource over a period of time.

16. The system of claim 15, wherein the indication of the current utilization level is further based at least in part on the computing resource determining that the change in the number of operations performed at the computing resource over the period of time is greater than a threshold number of operations.

17. The system of claim 14, wherein:

the one or more buffer bounds parameters comprises a parameter indicating a maximum number of input/output operations per second (IOPS); and configuring the operational capacity comprises configuring the operational capacity to be substantially equal to a sum of the maximum number of IOPS and the current utilization level.

18. The system of claim 14, wherein:

the one or more buffer bounds parameters comprises a parameter indicating a minimum number of input/output operations per second (IOPS); and configuring the operational capacity comprises configuring the operational capacity to be substantially equal to a sum of the minimum number of IOPS and the current utilization level.

19. The system of claim 14, wherein the one or more buffer bounds parameters comprise a maximum buffer capacity parameter and a minimum buffer capacity parameter.

20. The system of claim 14, wherein the indication of the current utilization level comprises an indication of a current operational capacity.

* * * * *